United States Patent Office 3,062,659
Patented Nov. 6, 1962

3,062,659
PROCESS FOR RETARDING THE RIPENING OF FRUIT
Archibald M. Hyson, Newark, and Maurice R. Stahler, Jr., Wilmington, Del., assignors to E. I. du Pont de Nemours and Company, Wilmington, Del., a corporation of Delaware
No Drawing. Filed July 6, 1960, Ser. No. 40,998
7 Claims. (Cl. 99—103)

This invention relates to a process for treating fruits and vegetables with formate esters. This invention also relates to novel products incorporating formate esters for release in the treatment of these fruits and vegetables.

By the term "fruit" is meant citrus fruits of all types, as well as fruit containing pits, such as peaches, avocados, plums, and mangoes, and fruit containing smaller seeds, such as apples, pears, bananas, grapes, and tomatoes.

By the term "vegetables" is meant any of the edible tubers such as potatoes, carrots, beets, turnips, and the like. The term is also intended to encompass such things as beans and peas, and also such stalk plants as celery, rhubarb, and asparagus.

A source of economic loss to the fruit and vegetable grower arises from the necessity of having to pick certain fruits and vegetables such as citrus fruits, bananas, peppers, and the like while they are still green. They are picked in this condition so that they may reach the consumer before over-ripening occurs. Since these fruits and vegetables must thus be harvested before the maximum weight gain occurs, there is considerable economic loss to the grower. It should also be noted that fruits and vegetables picked before they are completely ripe lose palatability.

Sprouting of tubers in storage is also a problem because of the weight loss involved. Compositions have been developed for dusting tubers prior to storage to prevent sprouting, but these have not been completely satisfactory.

It is an objected of this invention to provide a process which delays the ripening of fruits and vegetables so that they may be picked and shipped at a later stage of ripening, and also to retard the sprouting of tubers while in storage.

Another object is to provide thin films, sheets, layers, and the like, which can be supported in a laminate or coated on a surface, or can be self-supporting, and can be made of such materials as paper, natural or synthetic resins and the like, which films, sheets, or layers have incorporated therein a small amount of at least one of the formate esters described below. These can be used in the wrapping or packaging of the fruits and vegetables to provide a gradual release source of the formate ester.

Other objects and advantages of the invention will appear hereinafter.

We have discovered that the volatile esters of formic acid, especially alkyl formates, retard the ripening processes of fruits and vegetables and also retard sprouting of tubers. This is accomplished by maintaining them in contact with the vapor of said ester. The preferred quantity of ester employed is from 0.0001% to 5.0% of the weight of the fruit. The ripening and sprouting processes will be significantly retarded while this contact is maintained, and ripening or sprouting will proceed normally when the fruits and vegetables are removed from contact with the formate ester vapors.

The formate esters that can be used according to the present invention are the volatile formate esters including straight chain alkyl esters and also those containing branching or cyclo aliphatic groups and/or unsaturation in the alcohol moeity of the ester. Examples of these various types are methyl formate, ethyl formate, propyl formate, butyl formate, amyl formate, hexyl formate, heptyl formate, octyl formate, nonyl formate, decyl formate, undecyl formate, dodecyl formate, tridecyl formate, and tetradecyl formate. All position isomers of these formates can also be used. In addition, 2-ethylhexyl formate, isooctyl formate, allyl formate, crotyl formate, and cyclohexyl formate can be used.

The volatile formates which can be employed in the practice of this invention are preferably alkyl formates having from 1 to 14 carbon atoms in the alkyl group as enumerated above. Particular advantages are obtained in some uses and especially in the film and paper products of this invention by the use of higher alkyl formates of from 8 to 14 carbon atoms.

This invention can be practiced in a number of ways as long as the vapors of the formate ester effect contact with the fruit being treated. The longer the contact, of course, the longer the period of effective delay of ripening and inhibition of sprouting.

It will be readily understood, therefore, that the process of this invention in one embodiment is preferably carried out within a confined or enclosed space, area, or container. Anything will serve that acts to present some barrier to the rapid dissipation of the vapors of the volatile ester. For example, the barrier or closure can conveniently be a plastic or paper covering or wrapper, a plastic, paper, or cardboard sheet under and/or over or otherwise partially or completely around one or a number of the fruit or vegetable, as covering a basket or lining a crate. The closed space can consist of a storage room, refrigerated compartment, warehouse, freight car, etc.

The formate esters can be used in concentrated form without adjuvants simply by placing a vessel of the liquid in the same area as the fruit or vegetable.

Mixtures of formates can, of course, be used in this invention and in particular mixtures containing lower alkyl together with higher alkyl formates offer special advantages.

In another embodiment, the esters can be incorporated in formulations such as emulsions, suspensions, solutions, or the like, which can be used to treat the fruit or vegetable by a dip or spray application. These formulations can also be applied to the sheets, films, papers, absorbent papers, etc., which in turn are placed in close proximity to the fruit or vegetable during storage or shipment. These formulations can be used hot or cold and can contain, in addition to the essential volatile formate ester ingredient, materials such as waxes, oils, emulsifying agents, dispersing agents, coloring agents, etc., as will be readily understood. These and other conventional additives of fruit- or vegetable-treating and paper-treating compositions can be used according to procedures well known in the art.

In a particularly preferred aspect, the volatile formate ester constitutes an essential component of a stratum or the like. For example, wrapping or absorbent paper can be impregnated with the ester by simply dipping the paper into the liquid ester, followed by drying. Sufficient ester is retained thereby within the paper to volatilize gradually under use conditions to release the formate ester vapors over a period of time. This paper can be used to wrap the fruit or vegetable, or can be inserted as a sheet between layers of fruit or vegetables in a packing container. In another article, the ester can be admixed with a vapor-permeable resinous material which is then subsequently formed into a sheet or film. Suitable resinous materials include those prepared from polyolefins such as polyethylene, polypropylene, and the like, polyvinyl chloride, etc. Regenerated cellulose film can also be used. The films can be formed by casting, extrusion, or other conventional techniques. The films, like the paper, or like similar articles or coated surfaces, are used as described above. The articles can incorporate the ester in an amount from 0.2% to 50% and higher, based on the total weight, depending on the type of film or material and the method and duration of the intended use. From 0.5% to 20% is preferred.

The invention will be further clarified by the following illustrative examples.

Example 1

Bananas of the Gros Michel variety were obtained in the grass-green stage for these tests. The test chambers consisted of desiccators, in each of which were placed green bananas and a small amount of formate ester. The desiccator vent remained open but was covered by cloth gauze. The degree of ripeness of the bananas was noted at the end of 6, 7, 8, 9, and 10 days. The results are summarized in the following table:

| Test Compound | Concen., g. | Percent of Test Compound Volatilized | Ripening Progress, Days | | | | | |
|---|---|---|---|---|---|---|---|---|
| | | | 0 | 6 | 7 | 8 | 9 | 10 |
| Control | | | *2 | 3 | 3 | 4 | 4 | 4 |
| Methyl formate | 0.1 | 100.0 | 2 | 2 | 2 | 2 | 2 | 2 |
| Decyl formate | 0.5 | 3.7 | 2 | 2 | 2 | 2 | 2 | 2 |
| Lauryl formate | 0.5 | 0.6 | 2 | 2 | 2 | 2 | 2 | 2 |
| Tetradecyl formate | 0.5 | 0.3 | 2 | 2 | 2 | 3 | 3 | 3 |

*Color code: 2=light green; 3=yellowish green; 4=yellow with traces of green.

From the above it will be seen that the control bananas which were not treated with the formate ester vapors ripened to a yellow stage in 8 days, whereas bananas treated with formate esters remained in their original light green condition for up to 10 days in the case of methyl formate, decyl formate, and lauryl formate. In the case of tetradecyl formate, the bananas progressed no further in the ripening process than a yellowish-green stage after 10 days. Similar results were obtained by using the formates listed in col. 2, lines 1 to 8.

Example 2

Green tomatoes were placed in each of two desiccators maintained at a temperature of 75° F. In one desiccator was placed 0.5 g. of lauryl formate. The second was maintained as the control. The ripeness of the tomatoes was noted after 2, 3, 4, 5, 7, and 11 days. The results follow:

| Test Compounds | Concen., g. | Percent of Test Compound Volatilized | Ripening Progress, Days | | | | | | |
|---|---|---|---|---|---|---|---|---|---|
| | | | 1 | 2 | 3 | 4 | 5 | 7 | 11 |
| Control | | | *11123 | 12334 | 33445 | 33455 | 44455 | 45555 | 55555 |
| Lauryl formate | 0.5 | 0.6 | 11123 | 11233 | 22344 | 22344 | 22344 | 23455 | 33455 |

*Color code: 1=green; 2=light green; 3=blush of pink; 4=pink; 5=red.

From the above it will be seen that after 4 days the control desiccator to which no formate ester had been added contained tomatoes which were already in the pink-red stage of ripening, whereas the desiccator containing the lauryl formate contained tomatoes, 3 of which were only in the very early pink stage of ripening.

After 11 days the control tomatoes were all completely ripened, whereas only 2 of the tomatoes which had been treated with lauryl formate were completely ripe, while the other 3 were still in the earlier stages of ripening.

Example 3

Both white and yellow peaches in a firm condition were placed in desiccators containing (1) lauryl formate; (2) tetradecyl formate; (3) cyclohexyl formate; and (4) no additive. The degree of ripeness was noted after 2 and 3 days. The results after storage at 75° F. are given below:

| Test Compounds | Concen., g. | Percent of Test Compound Volatilized | Ripening Progress, Days | | |
|---|---|---|---|---|---|
| | | | 0 | 2 | 3 |
| Control | | | *2 | 3 | 4 |
| Lauryl formate | 0.5 | 0.6 | 2 | 2 | 3 |
| Tetradecyl formate | 0.5 | 0.3 | 2 | 2 | 2 |
| Cyclohexyl formate | 0.5 | | 2 | 2 | 2 |

*Color code: 2=slightly yellow or very light green; 3=yellow or very pale green; 4=dead ripe.

It is apparent that after 3 days the control peaches had ripened to an undesirable degree. The treated peaches, on the other hand, proceeded no further than a yellow or very pale green stage, and in the case of tetradecyl formate, no ripening was observed at all.

Similar results were obtained by using the formates listed in col. 2, lines 1 to 8, in the same concentrations as in this example.

Example 4

Potatoes were placed in desiccators containing (1) decyl formate; (2) lauryl formate; (3) tetradecyl formate; and (4) no additive. Results after 30 days' storage at 75° F. are shown below:

| Test Compound | Wt. of Sprouts (g.) after 30 Days | Percent Reduction of Sprouting over Control |
|---|---|---|
| Control | 10.3 | |
| Decyl formate | 2.1 | 80 |
| Lauryl formate | 2.7 | 74 |
| Tetradecyl formate | 2.9 | 71 |

These data show that sprouting of potatoes can be reduced as much as 70–80% by treatment with formate ester vapors. Similar results were obtained by using the formates listed in column 2, lines 1 to 8.

Example 5

Carrots were placed in each of two polyethylene bags. One contained no additive and the other contained 5 drops of methyl formate. Both bags were sealed and, after four days' storage at 75° F., the control carrots had begun to sprout. No sprouts were evident after seven days on those treated with methyl formate.

This application is a continuation-in-part of my copending application Serial No. 852,613, filed November 13, 1959, as a continuation-in part of copending application Serial No. 832,907, filed August 11, 1959.

The invention claimed is:

1. A process for retarding the ripening of fresh fruit and vegetables and the sprouting of tubers, said process comprising maintaining said fruit, vegetables and tubers in contact with from 0.0001% to 5%, by weight, of a volatile formate ester.

2. A process for retarding the ripening of fresh fruit and vegetables and the sprouting of tubers, said process comprising maintaining said fruit, vegetables and tubers in contact with from 0.0001% to 5%, by weight, of an alkyl formate having form 1 to 14 carbon atoms in the alkyl group.

3. A process for retarding the ripening of fresh fruit and vegetables and the sprouting of tubers, said process comprising maintaining said fruit, vegetables and tubers in contact with from 0.0001% to 5%, by weight, of methyl formate.

4. A process for retarding the ripening of fresh fruit and vegetables and the sprouting of tubers, said process comprising maintaining said fruit, vegetables and tubers in contact with from 0.0001% to 5%, by weight, of ethyl formate.

5. A process for retarding the ripening of fresh fruit and vegetables and the sprouting of tubers, said process comprising maintaining said fruit, vegetables and tubers in contact with from 0.0001% to 5%, by weight, of N-propyl formate.

6. A process for retarding the ripening of fresh fruit and vegetables and the sprouting of tubers, said process comprising maintaining said fruit, vegetables and tubers in contact with from 0.0001% to 5%, by weight, of isoamyl formate.

7. A process for retarding the ripening of fresh fruit and vegetables and the sprouting of tubers, said process comprising maintaining said fruit, vegetables and tubers in contact with from 0.0001% to 5%, by weight, of lauryl formate.

References Cited in the file of this patent

UNITED STATES PATENTS

| | | |
|---|---|---|
| 2,022,139 | Meder | Nov. 26, 1935 |
| 2,511,987 | Mrak | June 20, 1950 |

FOREIGN PATENTS

| | | |
|---|---|---|
| 349,561 | Great Britain | May 21, 1931 |
| 517,079 | Great Britain | Jan. 19, 1940 |
| 18,731 | Australia | Sept. 5, 1935 |

OTHER REFERENCES

Uses and Applications of Chemicals and Related Compounds, vol. II, Gregory, 1944, pages 135 and 214.